United States Patent [19]

Pitcher, Jr.

[11] 4,417,908

[45] Nov. 29, 1983

[54] HONEYCOMB FILTER AND METHOD OF MAKING IT

[75] Inventor: Wayne H. Pitcher, Jr., Big Flats, N.Y.

[73] Assignee: Corning Glass Works, Corning, N.Y.

[21] Appl. No.: 350,995

[22] Filed: Feb. 22, 1982

[51] Int. Cl.$^3$ ............................................. B01D 39/20
[52] U.S. Cl. .................. 55/523; 55/DIG. 5; 55/DIG. 30; 210/510.1; 422/180; 60/311; 29/163.5 F
[58] Field of Search ........... 55/484, 502, 523, DIG. 5, 55/DIG. 30; 210/510; 422/171, 180; 252/477 R; 428/116–118; 501/112, 119, 80; 60/295, 299, 311; 29/163.5 F; 165/8

[56] References Cited

U.S. PATENT DOCUMENTS 4,276,071  6/1981  Outland ................................. 55/523
4,329,162  5/1982  Pitcher, Jr. ........................... 55/523

FOREIGN PATENT DOCUMENTS

49-38266   4/1974  Japan .
55-114324  9/1980  Japan .
56-129020 10/1981  Japan .

Primary Examiner—David L. Lacey
Attorney, Agent, or Firm—R. N. Wardell

[57] ABSTRACT

The filter of honeycomb construction has a matrix of thin, interconnected walls which define a multiplicity of cells and which have interconnected open porosity of a volume and size sufficient to enable the fluid to flow completely across the thin walls in their narrow dimensions between adjoining cells and through the thin walls in their longer dimensions between adjoining or neighboring cells and to restrict the particulates in the fluid from flowing either completely across or through any of the thin walls, and has the cells divided into an inlet group and an outlet group and providing the inlet group of cells with substantially greater desirably about 25% or more greater, collective thin wall surface area than is provided to the outlet group of cells. Portions of the inlet group cells adjoin one another and share in common the same thin wall. Method of fabricating the filter comprises providing the matrix, and closing oen end of each of the inlet and outlet group cells, the closed ends of the inlet group cells being at an end face of the matrix opposite to the other end face thereof at which occur the closed ends of the outlet group cells, to provide the inlet group of cells with the aforesaid substantially greater collective thin wall surface area.

19 Claims, 21 Drawing Figures

HONEYCOMB FILTER AND METHOD OF MAKING IT

BACKGROUND OF THE INVENTION

The invention relates to filters for trapping solid particulates present in fluid streams and, in particular, to filter bodies formed from thin porous walled, honeycomb structures.

The removal of solid particulates from fluids, gases or liquids, in which the particulates are mixed is typically accomplished by means of filters made from solid materials which are formed into articles or masses having a plurality of pores of small cross-sectional size extending therethrough, which may be interconnected, such that the solid materials are both permeable to the fluids which flow through the article or mass and capable of restraining most or all of the particulates mixed in the fluid from passing through the article or mass, as desired. Such pores constitute what is termed "open porosity" or "accessible porosity". The restrained particulates are collected on the inlet surface(s) and/or within the pores of the material. The minimum cross-sectional size of some or all of the pores can be larger than the size of some or all of the particulates to be removed from the fluid, but only to the extent that significant or desired amounts of sufficiently large particulates become trapped on or within the filters during the transit of contaminated fluid. As the mass of collected particulates increases, the flow rate of the fluid through the filter generally decreases to an undesirable level. The filter is then either discarded as a disposable, replaceable element or regenerated by suitably removing the collected particulates so that it may be reused.

Certain considerations are helpful in evaluating and comparing filters. One is filter efficiency, that is, the amount of the suspended particulates of concern that are removed from the fluid as it passes through the filter (usually expressed as a percentage of the weight of all particulates in the fluid prior to its passing through the filter). Another consideration is flow rate, that is the volume of fluid per unit of time that passes through the filter and collected particulates. In a closed, continuous feed system, a comparable consideration is back pressure, i.e. the fluid pressure upstream from the filter which depends upon the downstream fluid pressure and the filter presure drop, i.e. the difference between the fluid pressure upstream and downstream from the filter caused by the presence of the filter and particulates thereon, and which is itself dependent upon the flow rate. Yet another consideration is operating time, the cumulative time of service of a filter before its flow rate or the back pressure becomes unacceptable so as to necessitate replacement or regeneration of the filter. Yet another consideration is capacity, the amount of particulate that the filter can hold while still providing a minimum acceptable flow rate or maximum acceptable back pressure. Other desirable features of the filter include compact structure, mechanical integrity, inertness or non-deleterious reaction with the fluid and/or particulate material.

It has been known for some time that honeycomb structures having a plurality of hollow passages or cells extending through them, which are formed in whole or in part by thin porous interconnected walls, may be successfully employed in filtering applications. U.S. Pat. Nos. 4,060,488, and 4,069,157 describe fluid filtering apparatus constructed by applying to a porous support body such as a thin porous walled honeycomb structure, a suitable filtering membrane. The membrane allows a separable component of a fluid solution or mixture transversing the honeycomb structure passages supporting the membrane to pass into the porous support structure. The filtrate fluid migrates through the open porosity of the support structure to an internal reservoir or to an outer surface of the structure where it is removed.

U.S. Pat. Nos. 4,041,591 and 4,041,592 describe multiple flow path bodies and methods for fabricating the same from honeycomb structures having columns or layers of hollow cells which extend in a substantially mutually parallel fashion through the structure and which are formed by a plurality of thin intersecting walls. The structure is modified so that two separate fluids may be transported through alternate columns or layers of cells. It is suggested that the described multi-flow path body might optionally be used in filtration and osmotic separation applications by using porous materials to produce the original honeycomb structure. As described, the device would function like those of the aforesaid U.S. Pat. Nos. 4,060,488, and 4,069,157 which allow only a fraction of a fluid which is passed through the alternate columns or layers of cells to migrate across the thin porous walls into the adjoining interleaved columns or layers of cells while the remainder of the fluid, having a higher concentration of contaminant or separable constituent, can continue to pass through and exit the structure.

Porous walled honeycomb structures may also be used directly (i.e. without a filter membrane or other covering) to filter all fluid passed through the structure. Application Ser. No. 165,646, filed July 3, 1980 and assigned to the assignee hereof, and U.S. Pat. No. 4,276,071 both describe filters formed from honeycomb structures, themselves formed a multiplicity of thin, porous, intersecting walls which define a pair of open, opposing end faces and a multiplicity of hollow, substantially mutually parallel passages or cells extending longitudinally through the structure between the end faces. At each end face where the open transverse areas of the cells would normally be exposed, the ends of alternate cells are closed in a checkered or checkerboard pattern such as is depicted in an exemplary fashion in FIG. 2. The pattern is reversed at either end face so that each cell of the structure is closed at only one end face and shares common thin walls with adjoining cells which are closed only at the opposing end face of the structure. A contaminated fluid is introduced under pressure to a "inlet" end face of the filter body and passes into those cells open at the inlet end face ("inlet" cells). Because the inlet cells are closed at the opposing, "outlet" end face of the structure, the contaminated fluid is forced to pass across the narrow dimension of the thin, porous walls into the adjoining "outlet" cells (which are all closed at the inlet end face and open at the outlet end face of the structure) and through them from the outlet end face of the filter. All or substantially all of the solid particulate matter in the fluid is deposited on the thin wall surfaces defining the interior of the inlet cells or is trapped in the pores forming the open porosity of the thin walls. All of the contaminated fluid passing through the structure is filtered and all of the internal, thin walls of the structure, each of which is shared in common between an adjoining inlet and outlet cell, are utilized in filtering.

U.S. Pat. No. 4,276,071 also describes a second filter embodiment formed from a crossflow honeycomb structure in which layers of longitudinally extending and laterally extending passages are alternately stacked. Fluid containing solid particulate contaminant is passed into either end of one of the two commonly extending sets of passages and is recovered after filtering from the remaining set of interleaved, commonly extending passages. As only the thin walls separating the laterally and longitudinally extending layers of cells are permeable to the fluid, filtration reportedly occurs only through those thin walls which are shared in common between adjoining inlet and outlet passages. Accordingly, this device is only about one-half as efficient as a comparably sized and dimensioned honeycomb structure incorporating the previously described checkered pattern of alternate cells.

As is described and claimed in a copending application Ser. No. 350,998 entitled FILTER APPARATUS, assigned to the assignee of and filed on the same date as this application and incorporated by reference, by providing a filter of honeycomb structure with thin walls having at least a minimum requisite amount of interconnected open porosity, filtration can be achieved through all thin walls defining each inlet cell irrespective of the type of adjoining cell (i.e. inlet or outlet) with which the inlet cell shares its defining thin walls. Such filters, however, do not generally have as much particulate capacity or useful operating time as comparable (i.e. same geometric configuration, dimensions and material composition) checkered plugged filters.

SUMMARY OF THE INVENTION

It is an object of the invention to provide a filter of honeycomb structure having greater capacity than a comparable checkered plugged filter.

It is yet another object of the invention to improve the useful operating time of the filter of honeycomb structure by reducing the rate at which solid particulate contaminant is built up on the inlet cell surfaces of the filter.

According to the invention, these and other objects are accomplished by providing a filter of honeycomb structure comprising a multiplicity of interconnected thin porous walls defining at least one inlet face and at least one outlet end face of the filter and a multiplicity of cells each extending through the filter from at least one of the inlet or outlet end faces. The thin walls are formed with interconnected open porosity of a size and volume sufficient to enable the fluid to flow completely across the narrow dimension of the thin walls and completely through the longer dimensions of the thin walls and to also restrain at least a significant portion of the solid particulates in the fluid from passing either completely across or through the thin walls. Open porosity of at least about 25% and, preferably, of at least about 35% by volume is provided to achieve the necessary fluid flow through the longer dimensions of the thin walls. The open porosity may be provided by pores having a mean pore diameter as small as about 0.1 micron although larger pores are typically used. Both volumetric open porosity and mean pore size are determined by conventional mercury intrusion porosimetry.

All or substantially all of the cells are divided into an inlet group of cells, each of which is open at at least one inlet end face of the structure and closed where it may adjoin outlet end faces of the structure, and an outlet group, each of which is open at at least one outlet end face of the structure and closed where it may adjoin inlet end faces of the structure. Most importantly, the collective surface area of the thin walls defining the inlet group of cells is significantly greater than the collective surface area of the thin walls defining the outlet group of cells. Desirably, the collective surface area of the inlet group of cells should be at least about 25% greater than the collective surface area of the outlet group of cells and, preferably, about 2 to 4 times greater than the collective thin wall surface area of the outlet group of cells.

A significantly greater portion of the total collective cell wall area is provided to the inlet group of cells by positioning at least a portion of the inlet cells adjoining one another whereby the adjoining inlet cells share the same defining thin wall in common. Exemplary configurations are described wherein all or substantially all cells of the inlet group share at least one and, typically, two or more of their defining thin walls in common with other adjoining cells of the inlet group or, from a different perspective, share at least 33% and, typically, at least 50% or more of their defining thin walls in common with other adjoining inlet cells. Significantly greater collective inlet than outlet cell wall thin wall surface area may be provided by providing a greater number of inlet cells than the number of outlet cells provided or by differentially sizing the transverse cross-sectional areas of the inlet and outlet cells, or both.

Filter embodiments according to the present invention having open pore volumes preferably between approximately 40 and 70% formed by pores having mean diameters of between about 1 and 60 microns and preferably, between about 10 and 50 microns, and with thin walls less than about 0.060 in. (1.5 mm.) and preferably between about 0.010 and 0.030 in. (0.25 and 0.76 mm.) thick are used to remove particulate matter from diesel engine exhaust gases.

BRIEF DESCRIPTION OF THE DRAWINGS

Various embodiments of the invention will now be described with reference to the accompanying figures in which.

DETAILED DESCRIPTION OF THE INVENTION

Figure 1A:
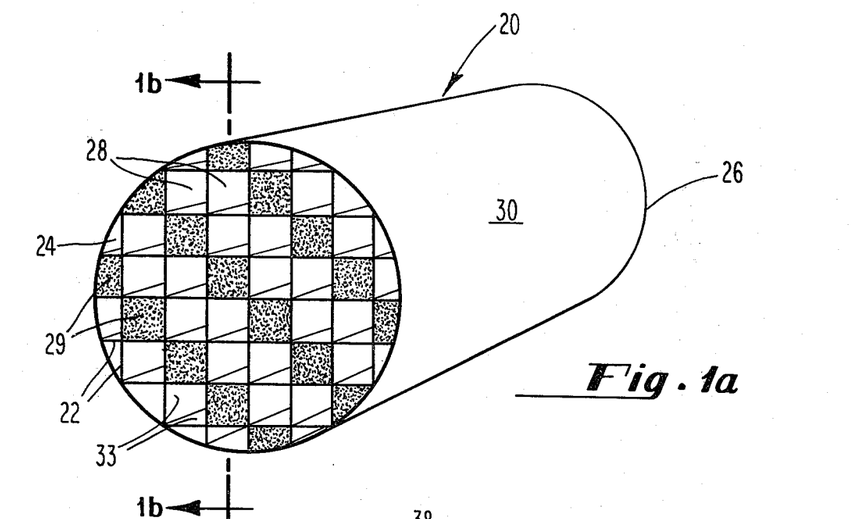
FIGS. 1a, 1b, and 1c depict various views of an exemplary embodiment filter of honeycomb structure according to the present invention.
Figure 1B:
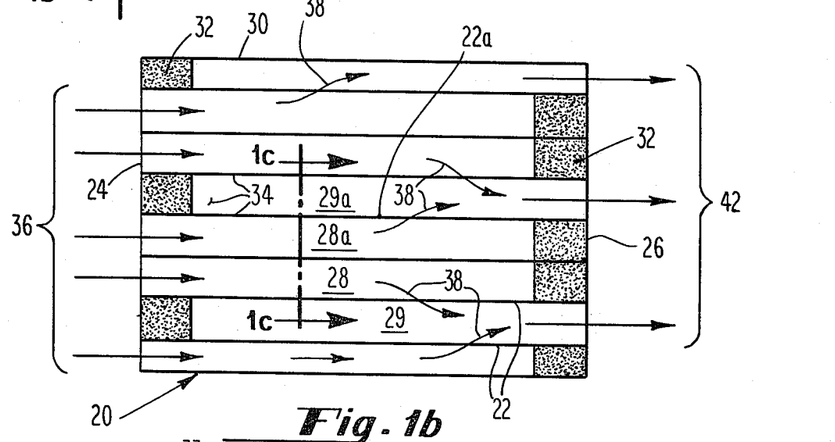
Figure 1C:
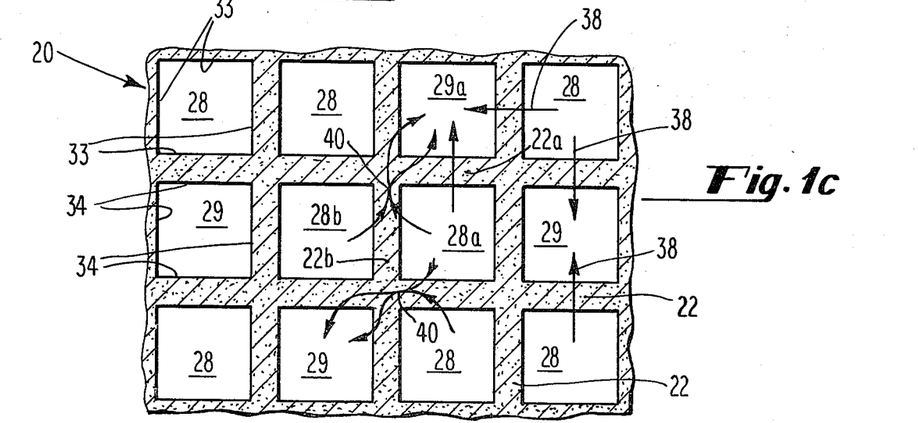

According to the invention, an improved filter of thin, porous walled honeycomb construction is provided by providing a total collective inlet cell thin wall surface area which is relatively greater than the total collective outlet cell surface area provided. FIGS. 1a, 1b, and 1c provide three views of an exemplary filter 20 of honeycomb structure according to the present invention. The filter 20 is cylindrically shaped and comprises a multiplicity of thin, porous interconnecting walls 22 which define a pair of substantially identical circular end faces 24 and 26 on opposite sides of the filter 20 and a multiplicity of hollow, open-ended passages or cells 28 and 29 which extend in a substantially mutually parallel fashion substantially longitudinally through the filter 20 between the end faces 24 and 26. One end of each of the cells 28 and 29 is plugged, covered or otherwise closed by suitable means near one or the other of the end faces 24 or 26 to provide groups of inlet and outlet cells 28 and 29, respectively, as is better seen in FIG. 1b, which is a longitudinally sectioned view of the filter 20 of FIG. 1a exposing a vertical column of inlet cells 28, which are open at the inlet end face 24 and closed by plugs 32 at the outlet end face 26, and outlet cells 29, which are open at the outlet end face 26 and closed by additional plugs 32 at the inlet end face 24, of the filter 20. As each of the cells 28 and 29 has been plugged at only one end thereof, the pattern of plugged cells visible on the inlet end face 24 of the filter 20 in FIG. 1a is reversed on the opposing outlet end face 26 (hidden in FIG. 1a).

The thin walls 22 can be made of any suitable material provided they have internal interconnected open porosity of at least 25% and preferably at least 35% of the bulk volume of the thin walls. This provides sufficient interstitial pore channels to allow the fluid to flow completely across their narrow dimension (e.g. between adjoining inlet and outlet cells) and most importantly, through their longer dimensions (e.g. between an inlet cell and an adjoining or neighboring outlet cell or the outlet end face 26) and to prevent at least a significant portion of the particulates from flowing either completely across or through the thin walls 22 in any direction. Thin walls 22 are typically formed with the same uniform thickness (i.e. their narrow dimension), although a copending application Ser. No. 350.994 filed on the same date as this application, assigned to the assignee hereof and incorporated by reference, describes and claims varying the thickness of the thin walls to achieve desired flow rates therethrough. Each cell 28 and 29 is defined by a subset of intersecting thin walls 22 or by a portion of the skin 30 and a subset of the thin walls 22. Each of the thin walls 22 is shared in common by a pair of adjoining cells 28 and/or 29 with each of the opposing outer surfaces of each thin wall 22 forming an inner surface 33 or 34 of an inlet or outlet cell 28 or 29, respectively.

Figure 2:
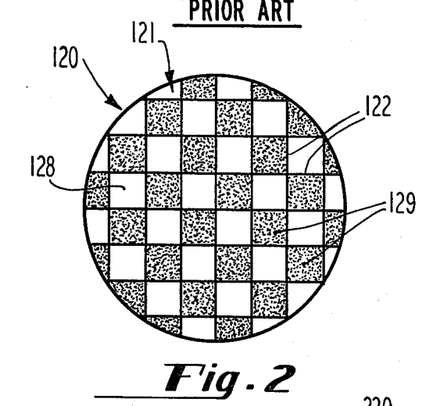
FIG. 2 depicts diagrammatically an end face of an exemplary honeycomb filter employing the checkered plugging pattern depicted in U.S. Pat. No. 4,276,071 and pending application Ser. No. 165,646 filed July 3, 1980.
Figure 3:
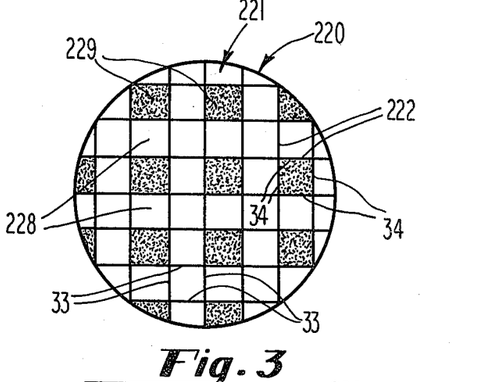
FIGS. 3 through 7 depict diagrammatically end face views of other alternate embodiments of the present invention.
Figure 4:
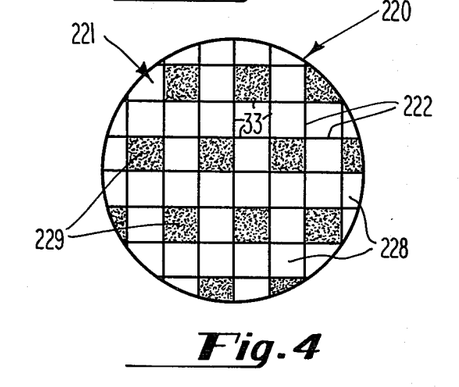
Figure 5:
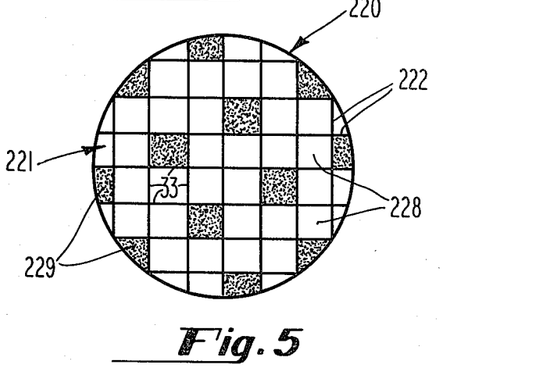

FIG. 2 depicts an inlet end face 121 of an exemplary honeycomb filter 120 employing the checkered inlet/outlet cell pattern referred to above in the BACKGROUND OF THE INVENTION and described in the aforesaid application Ser. No. 165,646 and U.S. Pat. No. 4,276,071. Inlet and outlet cells 128 and 129, respectively, are alternated with one another so that each inlet cell 128 shares thin walls 122 in common only with adjoining outlet cells 129 and vice versa. This requirement that each type of cell share thin walls with only the other type of cell results in the filter 120 having substantially equal collective inlet and outlet cell thin wall surface areas. Those familiar with honeycomb filter art will appreciate that the back pressure of a filter of honeycomb structure is determined by several contributing factors including thin wall characteristics (width, open porosity, mean pore size, etc.), inlet and outlet cell characteristics (cell density and sizes, inlet/outlet cell ratios, relative sizes and arrangement, etc.) and particulate characteristics (rate of deposit, effective porosity, etc.). Asymmetrically apportioning the thin wall area of a filter of given geometry in favor of greater collective inlet cell surface area typically reduces its effective capacity and increases its initial back pressure. However, I have appreciated that by providing thin walls having the described requisite open porosity this increase in initial back pressure can be offset by a decrease in the contribution to back pressure due to particulate buildup, as the particulates may be filtered through all inlet cell wall surfaces and this, spread over a relatively greater area. As a result, the capacity of a honeycomb filter of given configuration and having the requisite porosity in its thin walls may be increased by asymmetrically apportioning more of the thin wall surface area to the inlet than to the outlet cells. This, in turn, effectively increases the useful operating time of the filter.

Thin wall surface area may be asymmetrically apportioned in several ways. For example, as substantially all of the inlet and outlet cells 28 and 29 of the exemplary filter 20 of FIGS. 1a-1c have the same surface area (i.e. the same length, transverse cross-sectional geometry and size) substantially greater collective inlet cell thin wall surface area as compared to collective outlet cell surface area has been provided by creating more inlet cells 28 than outlet cells 29. Approximately 67% of the cells and collective cell surface area of the filter 20 of FIGS. 1a-1c are inlet cells 28 and inlet cell surface areas 33, the remaining 33% being outlet cells 29 and outlet cell surface areas 34. Thus, the collective thin wall surface area of the inlet cells 28 is about twice that of the outlet cells 29.

FIGS. 3 through 17 depict diagrammatically various inlet end face patterns of inlet cells 228 and outlet cells 229 extending longitudinally through a filter 220 of honeycomb structure between an inlet end face 221 (depicted in part) and an opposing outlet end face (not depicted), in a fashion similar to the cells 28 and 29 of the filter 20 of FIGS. 1a-1c. The depicted inlet/outlet cell patterns provide collective inlet cell surface areas substantially greater than the collective outlet cell surface areas provided. The inlet end face 221 and an opposing outlet end face (hidden) and the plurality of cells 228 and 229 are again formed by thin interconnected walls 222 having the previously described requisite open porosity. Again each filter 220 may be provided with a skin if desired around the cells 228 and 229 between the inlet end face 221 and outlet end face (not depicted). The outlet cells 229 have been shaded to indicate their closure by plugs or other suitable means near the inlet end face. The outlet cells 228 are again closed near the opposing outlet end face. The inlet end face patterns depicted in FIGS. 3 through 17 would be repeated across the entire inlet face 228 of the filter 220 and reversed across the entire outlet end face (not depicted) of each filter 220.

As can be seen from the FIGS. 3 through 17, various cellular transverse cross-sectional geometries may be employed in practicing the invention. In addition to the squares, rectangles, triangles and hexagons depicted, other equilateral shapes such as, for example, pentagons and octagons, other polylateral shapes such as, for example, rhomboids, and even continuous curved shapes such as, for example, circles and elipses, or combinations of linear and curved wall cell shapes may be utilized. In accordance with the teachings of the aforesaid application Ser. No. 165,646 incorporated by reference, the included angles formed by and between the intersecting thin walls (or adjoining thin wall sections in the case of continuously curved cell geometries) are preferably greater than about 60° to provide sufficient access of the fluid to all interior cell areas.

Figure 6:
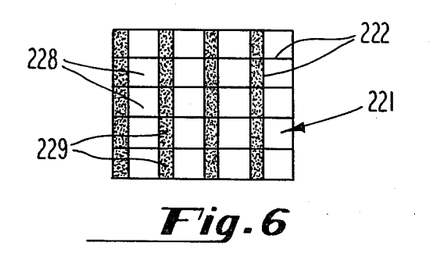
Figure 7:
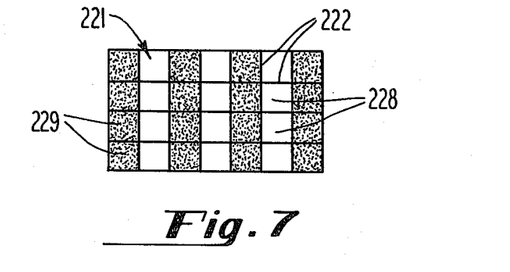
Figure 8:
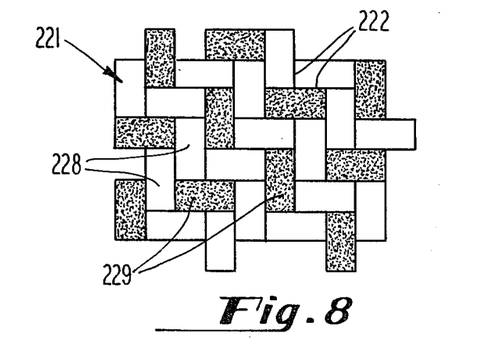
Figure 9:
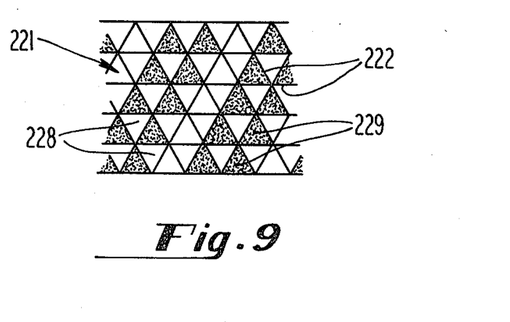
Figure 10:
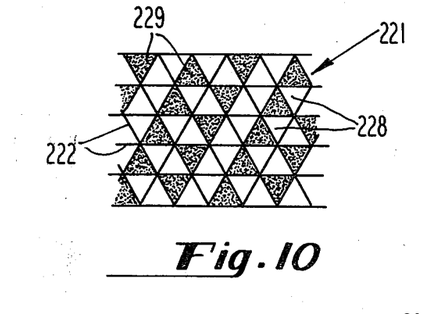
Figures 11, 13:
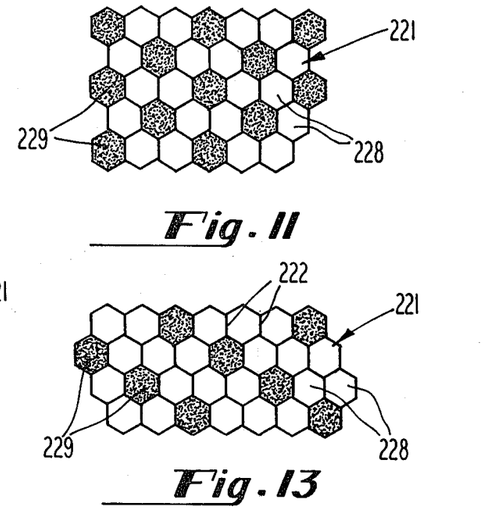
Figure 12:
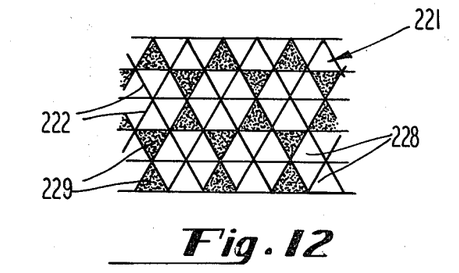
Figure 14:
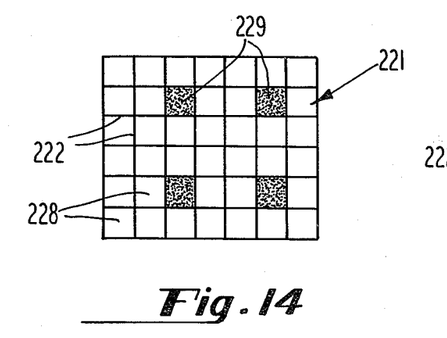
Figure 15:
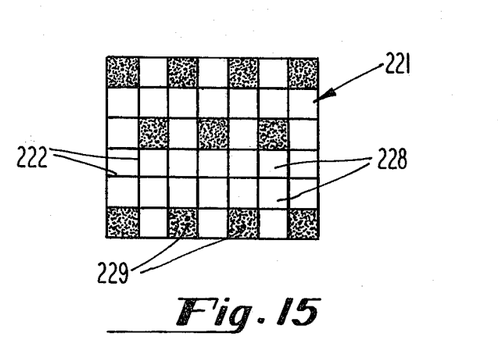
Figure 16:
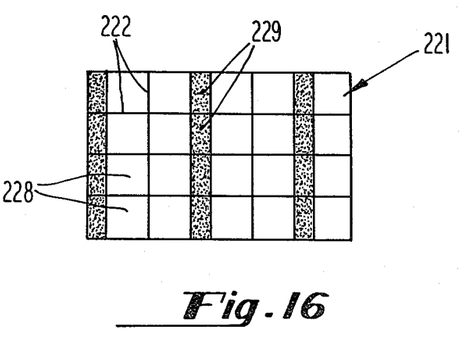
Figure 17:
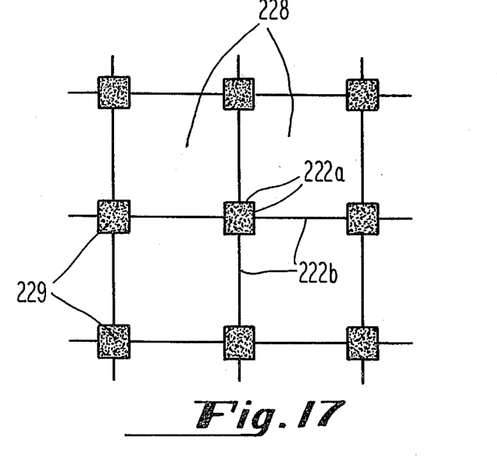

In FIGS. 3 through 5 and 7 through 15 the cells 228 and 229 have been formed with transverse cross-sectional geometries of the same uniform size and shape. Substantially greater collective inlet cell to collective outlet cell thin wall surface areas are provided, as in the case of the embodiment of FIGS. 1a–1c by providing a greater number of inlet 228 than outlet cells 229. Alternatively, greater collective inlet cell to outlet cell thin wall surface areas can be provided by varying the sizes and hence the individual thin wall surface areas of the inlet 228 and outlet cells 229, (i.e. as is depicted in FIGS. 6 and 17) or by varying both the numbers and sizes of the inlet 228 and outlet 229 cells (i.e. as is depicted in FIG. 16). FIGS. 7 through 11 and 15 depict uniform cellular geometry in inlet and outlet cell patterns that provide approximately 67% collective inlet and 33% collective outlet cell thin wall surface areas. In FIG. 6, if the width of the larger, square cells is twice that of the narrower, rectangular cells, approximately 57% collective inlet and 43% collective outlet cell thin wall surface areas are provided. If the same ratios are maintained in FIG. 16, approximately 73% collective inlet and 27% collective outlet cell thin wall surface areas are provided. FIGS. 3 through 5 and 12 through 15 also depict different ratios of uniformly sized and shaped inlet and outlet cells, 228 and 229, the cells in FIGS. 3, 4, 12, and 13 providing approximately 75% collective inlet and 25% collective outlet cell thin wall surface areas, in FIGS. 5 and 15 providing approximately 80% collective inlet and 20% collective outlet cell thin wall surface areas, and in FIG. 14 providing approximately 89% collective inlet and 11% collective outlet cell thin wall surface areas.

The thin walls 22 and 222 can be made of any suitable material that provides the aforesaid requisite interconnected open porosity including powdered metals, glasses, ceramics (generally crystalline), resins or organic polymers, papers or textile fabrics (with or without fillers), etc. and combinations thereof including, for example, glass-ceramic mixtures and cermets. It is preferred to fabricate the thin walls 22 and 222 from plastically formable and sinterable finely divided particulates and/or short length fibers of substances that yield a porous sintered material after being fired to effect the sintering thereof, especially powdered metals, glasses, ceramics, glass-ceramics, cermets or other ceramic based mixtures. In addition to volatizable plasticizers and/or binders, which may be used to prepare a workable batch mixture, any suitable or conventional fugitive or combustible (burn-out) additive can be dispersed within the formable and sinterable mixture so as to provide appropriate and adequate interconnected open porosity in the sintered intersecting thin walls 22 and 222. The requisite open porosity can be designed into the thin walls 22 and 222 by raw material selection as described in U.S. Pat. No. 3,950,175 incorporated by reference. Although the matrix of thin walls 22 and 222 may be fabricated by any suitable technique for the material selected, it is preferably formed monolithically with a skin 30, by extrusion from a sinterable mixture in a manner as disclosed in U.S. Pat. Nos. 3,790,654, 3,919,384, and 4,008,033 and a pending commonly assigned application Ser. No. 260,343 filed May 4, 1981, now U.S. Pat. No. 4,364,888, and incorporated by reference herein.

The cell ends may be closed with any material and in any manner compatible with the material of the thin walls 22 and 222 under the envisioned service conditions of the filter 20 or 220. This includes non-deleterious reaction to the thin wall material and the contaminated fluid, either singularly or is common, good adhesion to the thin walls, suitable durability to the fluid flows at the desired flow rates, similar coefficients of thermal expansion (if the filter is to be used at elevated temperatures), etc. Typically, plugs 32 are formed by charging a flowable or formable plugging material into selected cell ends and then performing steps such as curing, drying, firing, etc. which transform the formable/flowable material into a solid closure which adheres mechanically and/or chemically to the thin walls 22 or 222 and completely covers or fills the cell end. The plugs 32 or other closure means may be either porous or nonporous, although in the former case, the open porosity (i.e. pore volume and mean pore size) should be sufficiently small so as to prevent the passage of higher than desired levels of the solid particulates through or around the plugs 32 and hence through the filter 20 or 220.

Where a sinterable honeycomb matrix is used, compatible sinterable cement mixtures are typically used to form the plugs 32 in the selected cell ends. Methods and apparatus for charging flowable and/or formable materials such as sinterable cement mixtures into selected cell ends of a rigid honeycomb structure are described in the aforesaid application Ser. No. 165,646 and in the following pending applications which are assigned to the assignee hereof and incorporated by reference herein: Ser. No. 283,733, Ser. No. 283,732, Ser. No. 283,734, and Ser. No. 283,735, all filed July 15, 1981, and Ser. No. 295,610 and Ser. No. 296,611, both filed Aug. 24, 1981. Generally, these methods and/or apparatus may be used with either green (i.e. dried but not sintered) or sintered honeycomb matrices or with other rigid, non-sinterable honeycomb structures. Sinterable cement mixtures may also be used with green (i.e. sinterable) honeycomb matrices, if their sintering temperatures are sufficiently close to that of the matrices, as is described and claimed in another commonly assigned pending application Ser. No. 295,612 also filed Aug. 24, 1981 incorporated by reference, or a cement having a lower sintering temperature may be charged into a previously fired structure having a higher sintering temperature, as is described in the aforementioned application Ser. No. 165,646. Dimensional changes (typically shrinkage or possibly expansion) of a sinterable substrate and/or plugging material(s) upon drying and/or sintering may be compensated for by the use of a plugging material which foams when fired during sintering, such as the foam-type ceramic cements described in U.S. Pat. Nos. 3,189,512 and 3,634,111 and in commonly assigned application Ser. No. 165,647, filed July 3, 1980 and now Pat. No. 4,297,140, all incorporated by reference, or a plugging material which undergoes an appropriate net relative expansion with respect to the honeycomb structure, such as is described and claimed in the aforesaid pending application Ser. No. 295,612.

FIGS. 1b and 1c illustrate fluid flow through and across the thin walls 22. Similar flow will occur in the other described embodiments of the invention. Again, FIG. 1b depicts a vertical column of the cells 28 and 29 of the filter 20 of FIG. 1a. Inlet cells 28 (open at the inlet end face 24 and closed at the outlet end face 26) and outlet cells 29 (closed at the inlet end face 24 and open at the outlet end face 26) are interspersed with one another along the column. FIG. 1c is an expanded interior transverse sectioned view of the filter 20 of FIGS. 1a and 1b, depicting the cross sections of several inlet and outlet cells 28 and 29, respectively, and the interconnected thin walls 22 defining those cells. Contaminated fluid, represented by the arrows 36, is introduced to the filter 20 at its inlet end face 24 and enters through the inlet cells 28. Where an inlet cell 28 shares a thin wall 22 in common with an adjoining outlet cell 29 (such as, for example, the thin wall 22a shared by adjoining inlet and outlet cells 28a and 29a, respectively, in each of FIGS. 1b and 1c) primary fluid flow is across the thickness (i.e. narrow dimension) of the thin walls 22a, as is indicated by the lined arrows 38. Where a thin wall 22 is shared in common between a pair of inlet cells 28 (such as, for example, the thin wall 22b between the adjoining inlet cells 28a and 28b), primary fluid flow is through the longer dimensions of those thin walls (i.e. the outer surfaces 33 of the thin walls 22 forming the inner surfaces of the inlet cells 28a and 28b and into other interconnected thin walls 22 forming adjoining or neighboring outlet cells 29, as is indicated by the arrows 40 in FIG. 1c. Due to the interconnected open porosity, some fluid flow also occurs through the thin walls 22 in their remaining longer dimension (i.e. in the horizontal direction through the thin walls 22 in FIG. 1b and in directions normal to the plane of FIG. 1c) between the inlet cells 28 and the outlet cells 29 or the end face 26 or both. If the walls 22 are of uniform width (i.e. thickness), the incoming fluid will flow at a greater rate between those thin walls 22 shared in common between adjoining inlet and outlet cells 28 and 29, respectively (i.e. the flow indicated by the arrows 38 in FIGS. 1b and 1c) as that pathway offers the least initial resistance. As a layer of solid particulate begins building up on those thin wall surfaces of the inlet cells 28, back pressure across those walls increases and fluid flow rates into those walls tends to equalize to the flow rates into the thin walls 22 between adjoining inlet cells 28, as represented by the lined arrows 40. Flow through the various thin walls 22 forming the inlet cells 28 will constantly adjust as solid particulate is built up on any particular inner wall surface 33 or portion of an inner wall surface 33 of an inlet cell 28.

The inlet end face of an exemplary preferred embodiment of the subject invention, which is described and claimed in the aforesaid copending application Ser. No. 350,994, is depicted in FIG. 17. As was previously stated, the filter 220 is of a honeycomb structure and is provided with a first subset of inlet cells 228 (plugged at the opposing, hidden outlet end face of the filter 220) having substantially larger individual transverse cross-sectional areas than the areas of a subset of outlet cells 229 closed (indicated by shading) with appropriate means at the depicted inlet end face of the filter 220. The outlet cells 229 are located at ends of the thin walls 222b lying between adjoining inlet cells 228 and provide increased thermal shock resistance to the structure as compared to simple polylateral cell shapes such as squares, rectangles, other parallelograms and triangles formed by intersecting subsets of parallel thin walls extending in continuous planes across the end faces. In addition, the thin walls 222a forming the outlet cells 229 are different in thickness from the walls 222b separating and defining adjoining inlet cells 228 so as to permit differential fluid flow across and through the thin walls 222a and 222b, respectively, to equalize filtration on all inlet cell surfaces 33 or to maximize flow rates through the filter 220.

The composition and physical parameters of the thin walls 22 and 222, including their dimensions, percent, open porosity and mean pore size, will vary to satisfy the user's operating requirements such as filter strength, durability and efficiency; contaminant size and concentration; fluid flow rate, density and viscosity; etc. Envisioned uses of filters according to the present invention include exhaust gas and molten metal filters and heat recovery wheels, as are described in the aforesaid application Ser. No. 165,646.

Figure 18:
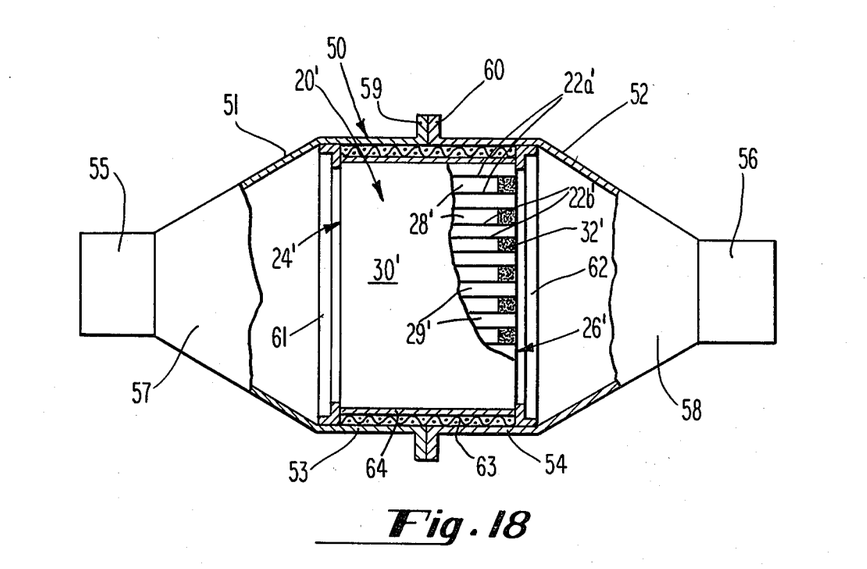
FIG. 18 depicts an exemplary diesel particulate filtering apparatus incorporating a filter of honeycomb structure according to the present invention.

A particularly desirable use of the present invention is for the removal of carbonaceous solid particulates from diesel engine exhaust gas so as to avoid air pollution by such particulates, which can range in diameter from about 5 micrometers (i.e. microns) down to 0.05 microns or less. FIG. 18 shows an exemplary form of such apparatus, which comprises the filter 20' held within a container or can 50. The filter body 20' may be any of those depicted in FIGS. 1a through 17, or any other according to the teachings of this invention which also have inlet cells 28' and outlet cells 29' formed by thin porous intersecting walls 22' and extending between opposing inlet and outlet end faces 24' and 26', respectively. A skin 30' has also been provided as the outer surface of the body 20' between the end faces 24' and 26'. The can 50 is similar to a conventional type of can employed for mounting catalytic converter honeycomb substrates in exhaust systems of internal combustion engines as is described, for example, in U.S. Pat. No. 3,441,381 incorporated by reference. The can 50 comprises two parts 51 and 52 respectively formed of filter-holding portions 53 and 54, conduit-connectors 55 and 56, conical portions 57 and 58 respectively joining connectors 55 and 56 to portions 53 and 54, and mating flanges 59 and 60 which are mechanically fastened together (e.g. by bolts and nuts not shown) to keep the can 50 properly assembled for use and so as to be capable of being unfastened in order to open the can 50 for replacement of filter 20'. Internal annular mounting members 61 and 62 of L-shaped cross-section are respectively fastened to portions 53 and 54 so as to respectively abut against end faces 24' and 26' and hold filter 20' in its proper fixed axial position within can 50. To cushion filter 20' against mechanical shock and vibration, it is ordinarily desirable to surround filter 20' with a wrapping or mat 63 of metal mesh, refractory fiber or the like, which may fill the annular space between filter 20' and portions 53 and 54. To minimize heat loss from filter 20' and excessive heating of portions 53 and 54, a layer of insulating material 64, such as glass or mineral wool mat, may also be wrapped around skin 30'.

Connectors 55 and 56 are suitably fastened (e.g. by welding or mechanical coupling) to upstream and downstream portions, respectively, of the exhaust gas pipe of a diesel engine. While the can 50 can be located in and form part of the exhaust gas conduit some distance downstream from the engine exhaust manifold, it desirably can be located near or at the exit from the exhaust manifold. The latter arrangement facilitates regeneration of the filter 20' by utilizing the higher temperature of the exhaust gas upon exiting the exhaust manifold to cause, with excess air in the exhaust gas, the combustion of carbonaceous particulates restrained in the filter 20'. The gaseous combustion products formed during regeneration can then pass on through and out of the filter 20' for emission through the connector 56 to the tailpipe (not shown) fastened to the connector 56. If desirable (especially when the can 50 is located downstream along the exhaust conduit some distance from the exhaust manifold), a combustion ignition device may be positioned in the can 50, such as a glow plug in the conical portion 57 or an electric heater within the central axis of filter 20' (similar to the device of U.S. Pat. No. 3,768,982 incorporated by reference), and secondary air may be injected into the can 50 upstream from the filter 20' to assist in regeneration of the filter 20' without removing it from the can 50. Additionally, catalyst substance(s) can be placed on and in thin walls 22' of filter 20' (similar to catalytic converter honeycomb substrates) to facilitate regeneration combustion in the filter 20'. In ordinary usage, frequent higher rotational (i.e. rpm) speed of the diesel engine can contribute sufficient heat (e.g. 400°–500° C. or higher) requiring less frequent replacement of filter 20'. Nevertheless, removed filters 20' can be reverse flushed with air to blow much of the trapped particulates out of it into a collector bag and then fully regenerated by high temperature air passed through it before reinstalling in can 50.

For diesel particulate filtering applications, honeycomb structures having cellular densities between about 10 and 300 cells/in.$^2$ (about 1.5 to 46.5 cells/cm.$^2$) are conceivably useful, with densities between about 100 and 200 cells/in.$^2$ (about 15.5 to 31 cells/cm.$^2$) preferred for light automotive applications. Wall thicknesses can vary upwards from the minimum dimension required for structural integrity, about 0.002 in. (about 0.05 mm.) for the extruded ceramic materials to be subsequently discussed, but a range of between about 0.010 and 0.030 inches (about 0.25 and 0.76 mm.) is preferable with these materials at the desirable cellular densities. Volumetric open porosity of the thin walls may vary, but should not be less than about 25% and desirably not less than about 35% of thin wall volume with a range of between about 40 to 70% preferred to minimize hydraulic back pressure to fluid flow through the longer dimensions of the thin walls. Mean pore diameters within the walls may also vary from about 1 to 60 microns with a range between about 10 and 50 microns preferred. Desired efficiencies may range from less than about 50% to about 90% or more depending upon the operating characteristics and operating schedule of the engine.

Ceramic materials such as cordierite material disclosed in U.S. Pat. Nos. 3,885,977 and 4,001,028, incorporated by reference, are generally preferred for diesel particulate trap filters because, as was earlier found in their use as catalyst substrates in internal combustion engine exhaust systems, these materials have properties that enable them to withstand and be durable under the thermal, chemical, and physical conditions to which they are subjected in such systems including those of diesel engines.

Thin wall matrices for diesel exhaust particulate filters may be formed by extrusion from the particular batch mixtures of TABLE I of the aforesaid application Ser. No. 165,646 and plugged with the described manganese-magnesium, foam-type cordierite cement, preferred for diesel exhaust and other filtering applications having high sodium ionic content, in the manner described in that application. In particular, it was found that filters utilizing the plugging patterns depicted in FIGS. 1a, 3, and 4 of this application were found to have greater average particulate capacity at back pressures above about 100 cm. of water than did checkered plugged filters (i.e. that illustrated in FIG. 2) of similar geometry when both types of filters were formed from the preferred batch mixture listed for SAMPLES D-E-F-G-H in TABLE I of the aforesaid application Ser. No. 165,646 and were comparison tested in a manner similar to the testing described therein. This capacity comparison was based upon cylindrical filters approximately 3.6 inches (about 9.3 cm.) in diameter and about 12 inches (30.5 cm.) overall length having square cells formed at a density of about 100 cells/in.$^2$ (about 15.5 cells/cm.$^2$) and formed by thin walls about 0.017 inches (0.6 mm.) in uniform thickness. The reduction in back pressure build-up from lower particulate build-up rates in filters of the same composition and geometry but plugged according to the pattern of FIG. 5 was not sufficient to compensate for their higher initial back pressures and at the 140 cm. water back pressure cut-off of the test, these filters had less particulate capacity than did the comparable checkered plugged filters. Other filters of identical composition and cellular geometry but having plugging patterns allocating more than 80% of the cellulose cell thin wall surface area to the inlet cells faired even more poorly with respect to the checkered filters at the 140 cm. water back pressure limit as would be expected from the results of the filters plugged in the FIG. 5 pattern.

Figure 19:
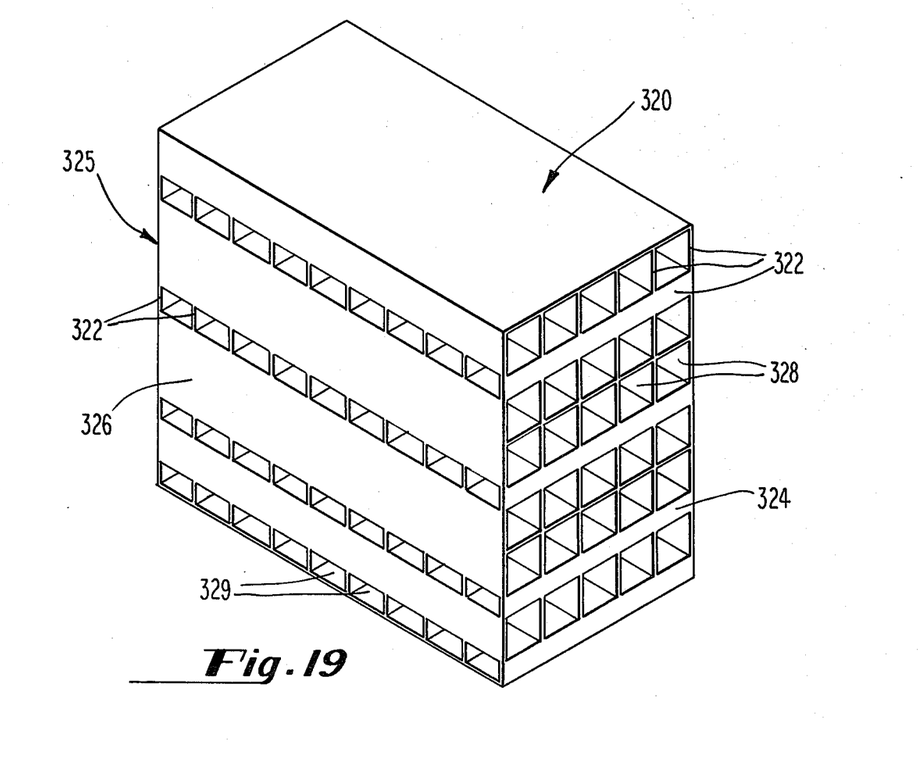
FIG. 19 depicts a crossflow type honeycomb filter utilizing the present invention.

In addition to honeycomb filters having cells extending in a single uniform direction through the filter, it is envisioned that the invention may be used with other types of honeycomb filters such as the exemplary cross-flow filter 320 depicted in FIG. 19. The filter 320 is again formed by a multiplicity of thin, interconnected porous walls 332 which define a pair of opposing inlet end faces 324 and 325 and an outlet end face 326 on three of the outer surfaces of the filter 320. A group of inlet cells 328 extend laterally through the filter 320 and between the inlet end faces 324 and 325 in layers. The inlet cells 328 are open at the inlet end faces 324 and 325 and those located at the outlet end face 326 are closed along that surface. Outlet cells 329 extend longitudinally through the filter 320 in layers interspersed among the layers of inlet cells 328. The outlet cells 329 are open at the outlet end face 326 and closed where they adjoin the inlet end faces 324 and 325. Fluid with solid particulate contaminant enters the filter 320 through the open ends of the inlet cells 328 at both inlet end faces 324 and 325. Again, the thin walls 322 have interconnected open porosity of a size and volume sufficient to allow the fluid to pass completely across and through the thin walls 322 in their narrow and longer dimensions while preventing contaminant from passing either completely through or across any dimension of the thin walls 322. Again, collective inlet cell area, which may be substantially greater than the collective outlet cell area, can typically be provided by providing more inlet than outlet cells, larger inlet than outlet cells or, as has been provided in the filter 320, both. Alternately, the filter 320 may be provided with a single inlet end face or with opposing outlet end faces or a pair of inlet and pair of outlet end faces.

While various embodiments of the invention and suggested modifications thereto have been described, it should be understood that other modifications could be made in the structure, arrangement, and composition of the described embodiments without departing from the scope of the invention which is more fully defined in the following claims.

I claim:

1. A filter for removing all or substantially all of the solid particulates in fluids passed through the filter comprising:
a multiplicity of interconnected thin porous walls defining inlet end faces and outlet end faces of the filter and a multiplicity of cells, each cell extending through the filter from at least one of the inlet and outlet end faces and having a surface area defined by surfaces of the thin walls exposed within the cell,
the thin walls containing interconnected open porosity of a volume and size sufficient to enable the fluid to flow across the narrow dimension of the thin walls between adjoining cells and through the longer dimensions of the thin walls between adjoining or neighboring cells and to restrain at least a significant portion of the solid particulates from passing either across or through any of the thin walls,
an outlet group of cells, each cell of the outlet group being open at a said outlet face and closed where adjoining any said inlet end face,
an inlet group of cells, each cell of the inlet group being open at a said inlet end face and closed where adjoining any said outlet end face, and
the collective thin wall surface area of the inlet group of cells being significantly greater than the collective thin wall surface area of the outlet group of cells.

2. The filter of claim 1 having a single inlet end face and a single outlet end face on opposing sides of the filter and said plurality of cells extends longitudinally through the filter between the inlet and outlet end faces.

3. The filter of claim 1 wherein said collective thin wall surface area of the inlet group of cells is at least about 25% greater than said collective thin wall surface area of the outlet group of cells.

4. The filter of claim 3 wherein said collective thin wall surface area of the inlet group of cells is between about 2 and 4 times greater than said collective thin wall surface area of the outlet group of cells.

5. The filter of claim 1 wherein each of substantially all cells of the inlet group shares two or more of its defining thin walls in common with other adjoining cells of the inlet group.

6. The filter of claim 5 wherein each of substantially all cells of the inlet group shares at least 75% of its defining thin walls in common with other adjoining cells of the inlet group.

7. The filter of claim 1 or 5 wherein substantially all of said plurality of cells have substantially square, transverse cross-sectional geometries.

8. The filter of claim 1 wherein the number of inlet cells is also substantially greater than the number of outlet cells.

9. The filter of claim 1 wherein the number of cells in the inlet group and the outlet group are substantially equal and the average individual, transverse cross-sectional areas of the inlet cells is greater than the average individual, transverse cross-sectional areas of the outlet cells.

10. The filter of claim 1 wherein the open porosity of the thin walls is at least about 25% or more by volume.

11. The filter of claim 10 wherein said open porosity is formed by pores having mean diameters of about 1 micron or more.

12. The filter of claim 11 wherein the open porosity of the thin walls is at least about 35% or more by volume.

13. The filter of claim 12 wherein the open porosity of the thin walls is also less than about 70% by volume.

14. In a diesel engine exhaust conduit, including the filter of claim 13 positioned in said conduit so as to remove carbonaceous solid particulate from diesel engine exhaust gas and wherein said pores have mean diameters of between about 10 and 50 microns.

15. The filter of claim 1 wherein said thin walls are formed from a ceramic-based material.

16. In the method of fabricating a filter for removing solid particulates from fluid streams comprising the steps of providing a honeycomb structure formed from a matrix of thin, intersecting porous walls which define a pair of open end faces and a multiplicity of hollow cells extending in a substantially mutually parallel fashion, closing a first group of cells near their end portions at one end face and the remaining cells near their end portion at the remaining end face, the interconnected open porosity of the thin walls being of volume and size sufficient to enable fluid flowing into the first group of cells to flow completely across the narrow dimensions of the thin walls into adjoining cells of the second group and through the thin walls in their longer dimension to adjoining or neighboring cells of the second group and preventing at least a significant portion of the solid particulates from passing completely across or through the walls in any of their dimensions, the improvement comprising the step of:
further closing said cells to provide substantially greater collective thin wall surface area to the inlet group of cells than the collective thin wall surface area provided by the outlet group of cells.

17. A compact through flow exhaust particulate filter element for diesel engines, said element comprising a ceramic monolith having a plurality of interlaced, thin gas filtering porous internal walls defining a plurality of parallel passages extending to opposite ends of the element, said passages including a first group comprising inlet passages open at one end of the element and closed at the other end and a second group comprising outlet passages closed to said one end of the element and open at the other end, the plurality of interlaced thin porous internal walls having internal interconnected open porosity of a volume and size sufficient to enable the fluid to flow across said walls in their narrow dimensions and through said walls in their longer dimensions and to restrain at least a significant portion of the particulates from passing either completely across or through any of the walls in any of their dimensions, and the improvement comprising:
the inlet passages having collective surface areas substantially greater than the respective collective surface areas of the outlet passages, and
portions of said inlet passages adjoining one another and sharing in common said interlaced, porous internal walls.

18. The filter element of claim 17 wherein the individual cross-sectional areas of the inlet passages are substantially greater than the respective individual cross-sectional areas of the outlet passages.

19. The filter of claim 1 wherein each of substantially all cells of the inlet group shares at least 33% of its defining thin walls in common with other adjoining cells of the inlet group.

* * * * *